Jan. 14, 1964    G. A. WALLACE    3,117,652
AUTOMOBILE HOIST
Filed Sept. 30, 1960    8 Sheets-Sheet 3
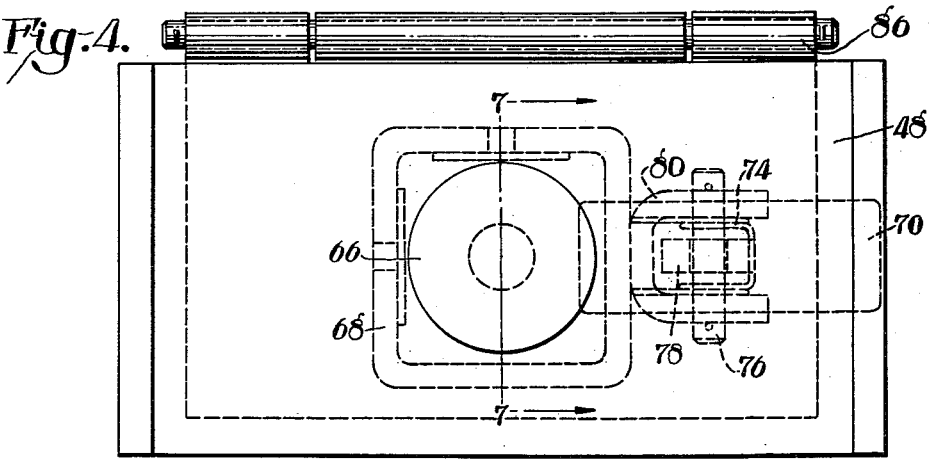
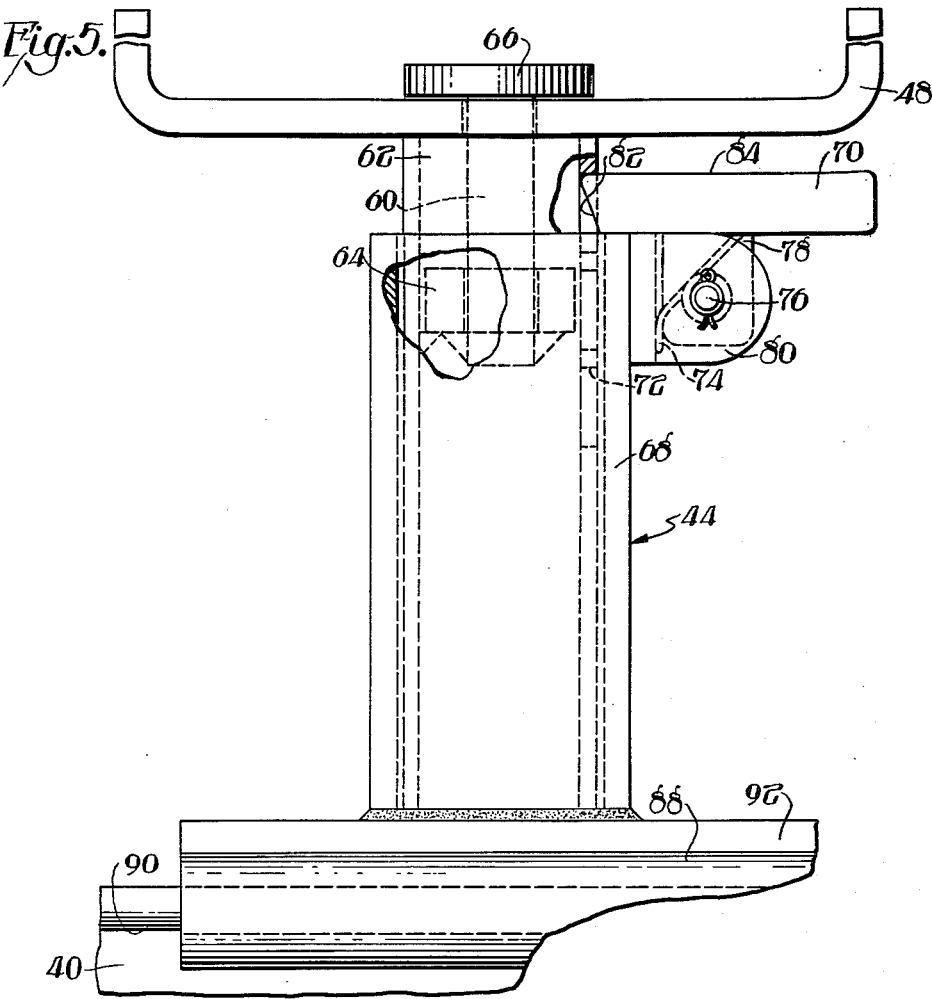

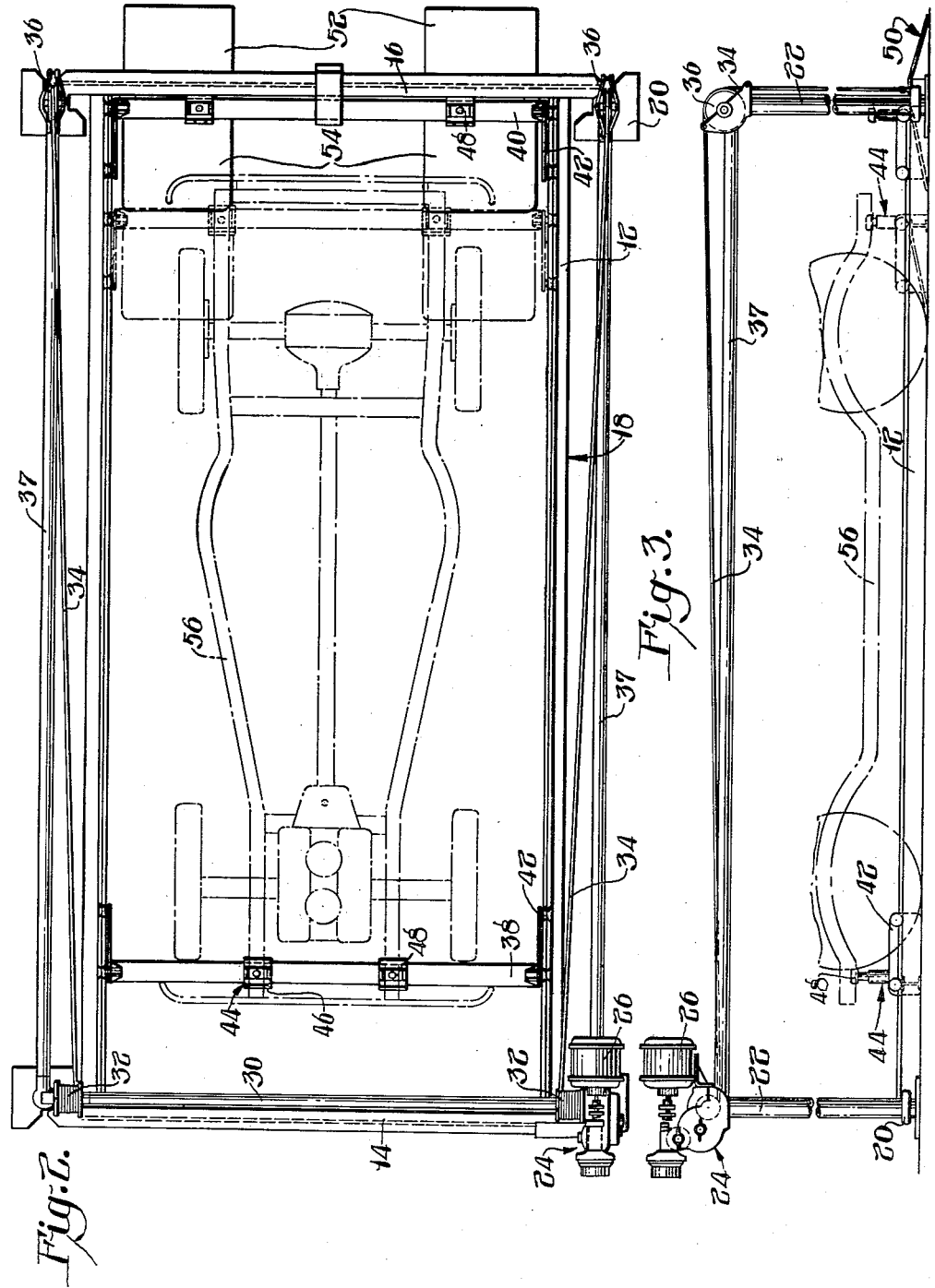

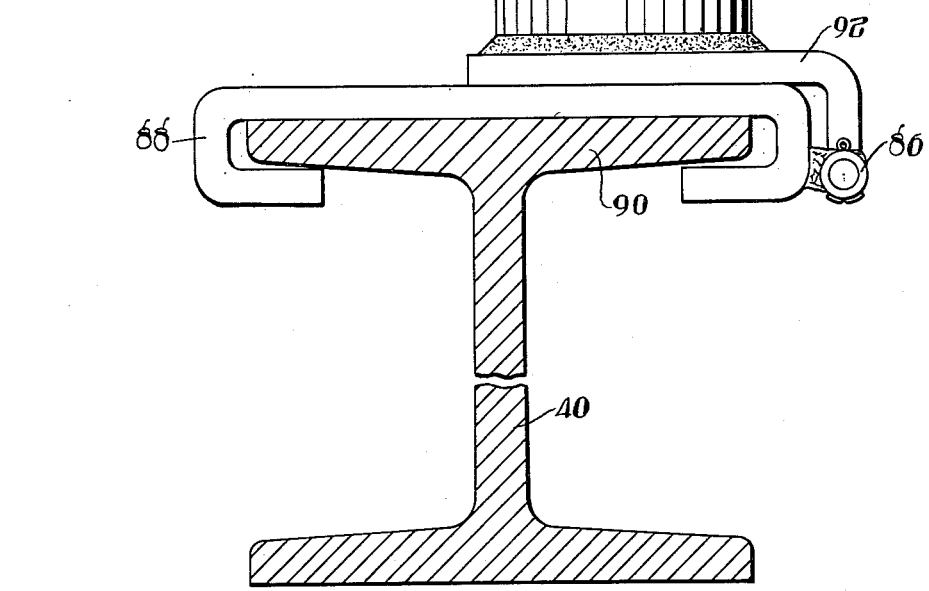

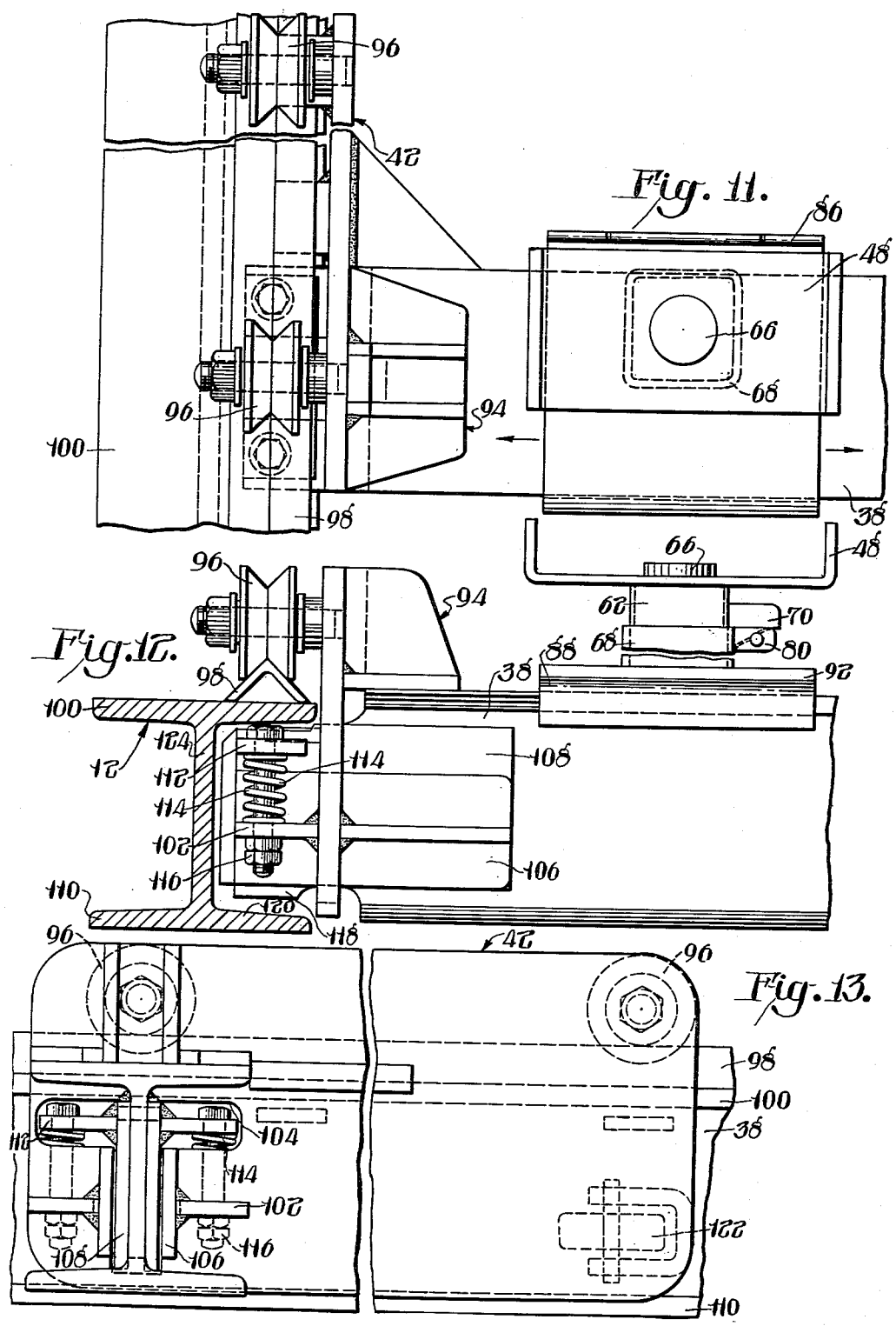

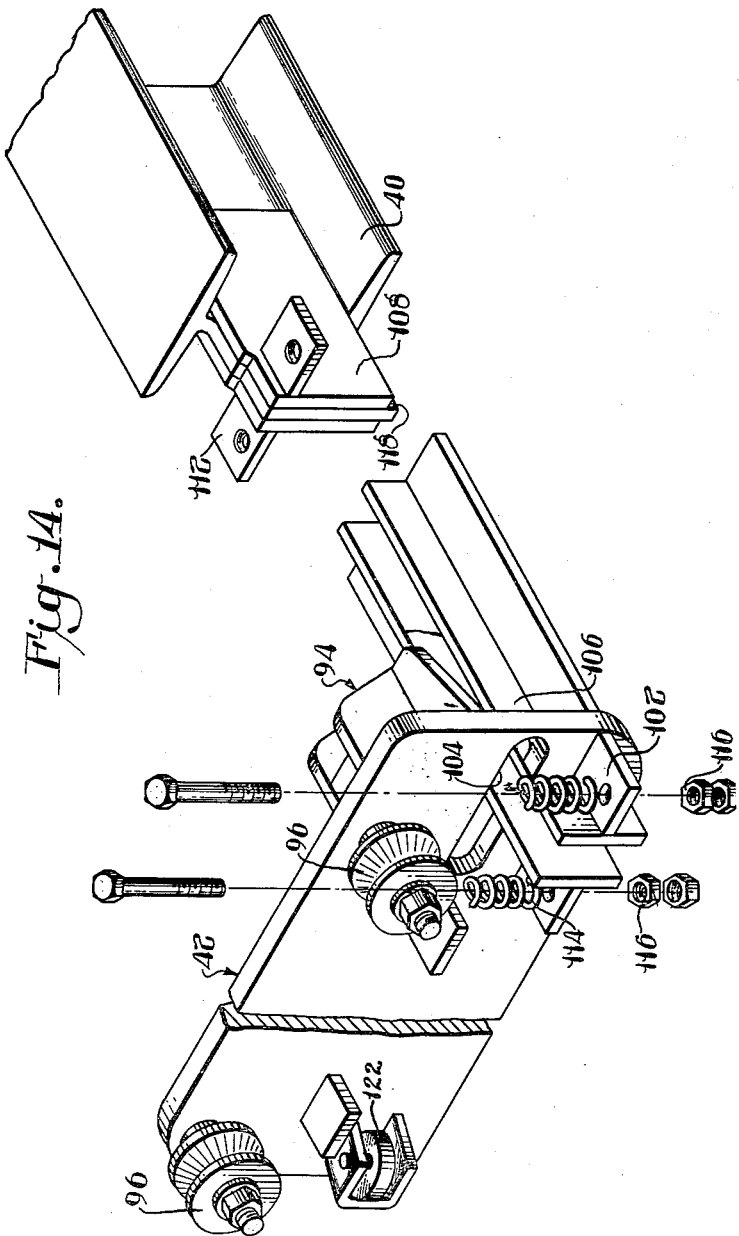

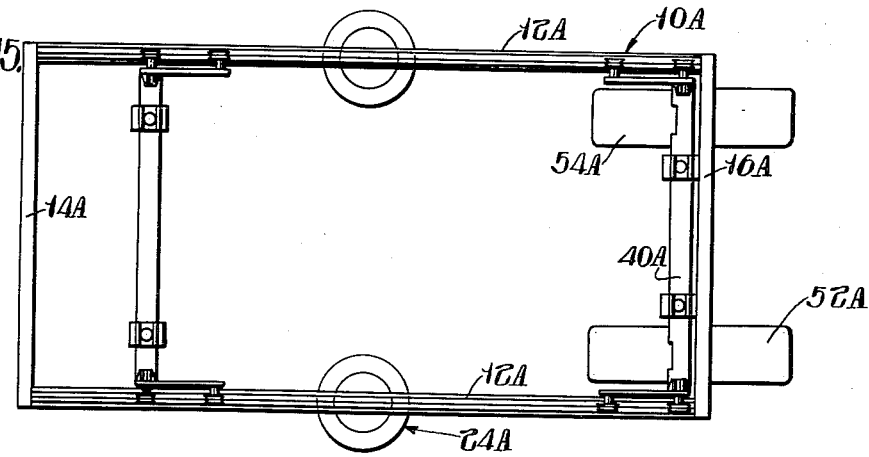
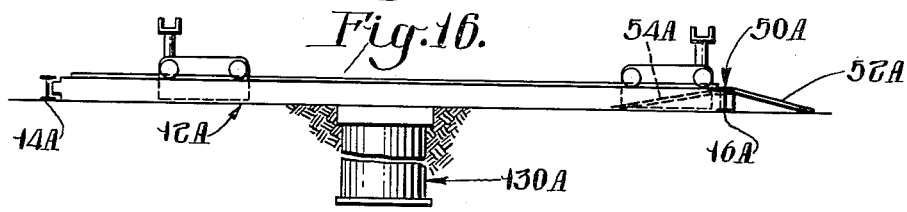
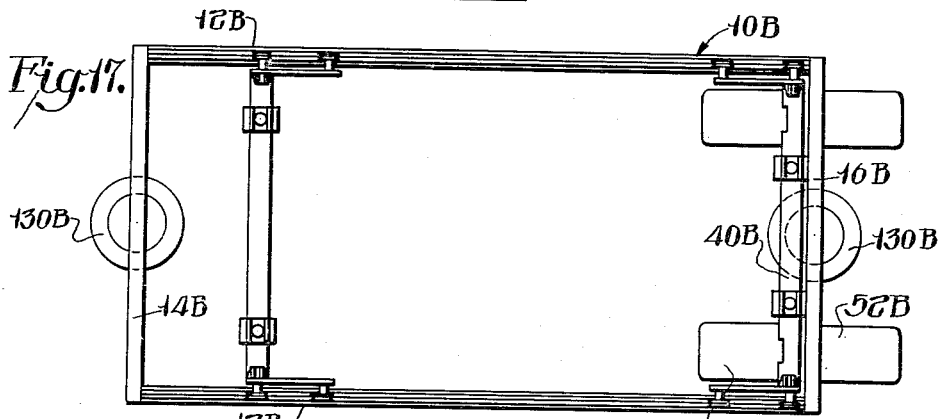
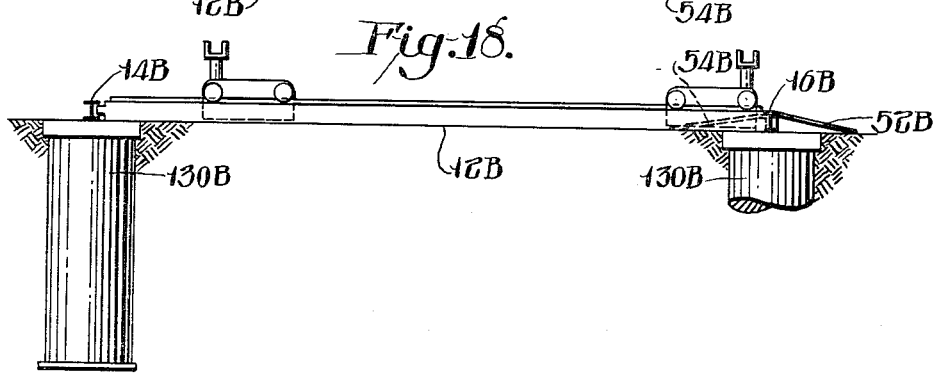

United States Patent Office 3,117,652
Patented Jan. 14, 1964

3,117,652
AUTOMOBILE HOIST
George A. Wallace, Philadelphia, Pa., assignor to The Globe Hoist Company, Philadelphia, Pa., a corporation of Maryland
Filed Sept. 30, 1960, Ser. No. 59,636
15 Claims. (Cl. 187—8.59)

This invention relates to a frame engaging automobile hoist, and is more particularly relates to such a hoist which provides substantially complete accessibility to all under-car parts.

Most automobile hoists of the type used in service stations obstruct at least part of the underside of the car which they are supporting. This is not a serious problem in ordinary service station work, but in certain repair work, such as transmission and muffler work, and undercoating application wide open accessibility to all portions of the underside of an automobile is highly desirable. However, it is quite difficult to lift an automobile without obstructing portions of its underside even when it is lifted by the frame in the currently prevalent manner.

An object of this invention is to provide a simple and economical hoist for lifting an automobile by the frame with a minimum of obstruction of its underside.

Another object is to provide such a hoist which is simple to install and operate and requires a minimum of adapters for engagement with all types of automobiles.

In accordance with this invention, a pair of individual cross beams are mounted to slide back and forth across two vertically movable longitudinally spaced beams which are substantially longer than any automobile to be handled and spaced apart from each other a distance sufficient to clear the outsides of the wheels of an automobile which is driven between them when they are resting at ground level. Pick-up elements are mounted upon the cross beams for engaging the frame of an automobile from below when they are positioned under the front and rear of the frame. When these pick-up means are engaged just inside the front and rear bumper brackets and the automobile lifted by raising the longitudinal beams, substantially the entire underside of the automobile is left clear for access. Furthermore, spotting and positioning of the adapters is simply accomplished by driving the automobile between the grounded longitudinal and cross beams, the cross beams are then slid into position under the front and rear ends of the car just inside of the bumper brackets. The pick-up means may be adjustable and hinged to facilitate engagement and dropping out of the way of an automobile in driving into and out of engagement with the hoist. Furthermore, the rear cross beam may include one portion of a ramp which cooperates with a corresponding portion upon an end beam connecting the longitudinal beams to provide a bridge for driving an automobile over the rear cross beams when it is moved adjacent the rear end beam. The cross beams also may be mounted upon resilient carriages which facilitate their movement.

Novel features and advantages of the present invention will become apparent to one skilled in the art from a reading of the following description in conjunction with the accompanying drawings wherein similar reference characters refer to similar parts and in which:

FIG. 2 is a plan view of the embodiment shown in FIG. 1 with the frame of an automobile shown in phantom in position for hoisting;

FIG. 3 is a view in elevation of the embodiment shown in FIG. 2;

FIG. 4 is a view of one of the pick-up adapters shown in FIGS. 1–3;

FIG. 5 is a view in elevation of the adapter shown in FIG. 4;

FIG. 6 is an end view of the adapter shown in FIGS. 4 and 5 mounted upon a cross beam;

FIG. 7 is a cross-sectional view taken through FIG. 4 along the line 7—7;

FIG. 11 is a plan view of the manner in which one of the cross beams of the embodiment shown in FIG. 1 is connected to the longitudinal beam;

FIG. 12 is a view in elevation of the part shown in FIG. 11;

FIG. 13 is an end view of the portion shown in FIG. 12;

FIG. 14 is an exploded perspective view of some of the parts shown in FIGS. 11–13;

FIG. 15 is a plan view of another embodiment of this invention;

FIG. 16 is a view in elevation of the embodiment shown in FIG. 15;

FIG. 17 is a plan view of still another embodiment of this invention; and

FIG. 18 is a view in elevation of the embodiment shown in FIG. 17.

Figure 1:
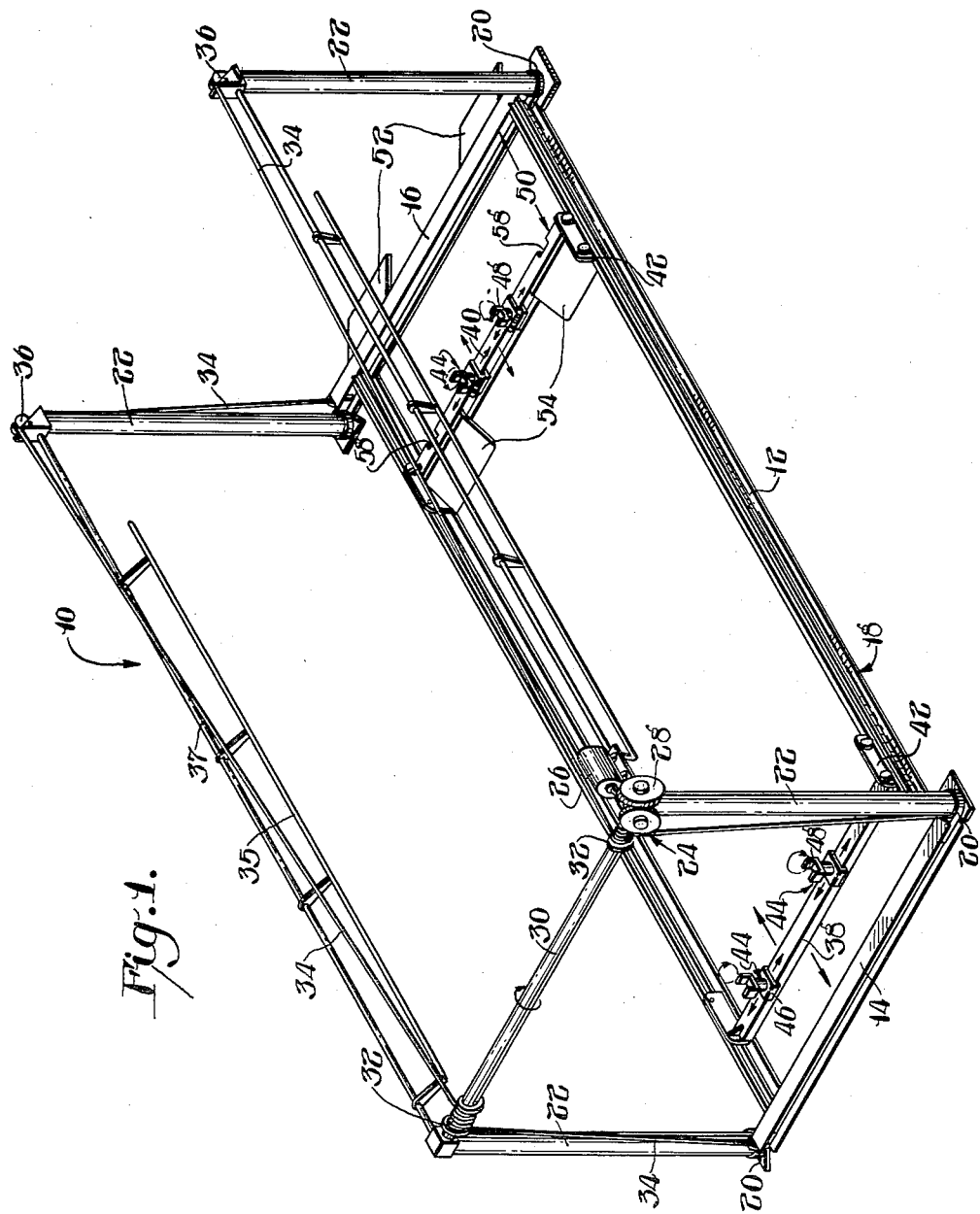
FIG. 1 is a perspective view of one embodiment of this invention.

In FIG. 1 is shown an automobile hoist 10 including a pair of vertically movable longitudinal beams 12 which are spaced apart from each other a distance sufficient to permit the wheels of an automobile to be driven between them. Beams 12 are, for example, spaced and held parallel to each other by front end beam 14 and rear end beam 16 which form together with beams 12 a substantially rectangular frame 18. Frame 18 is guided in its vertical movement by rings 20 connected to the ends of end beams 14 and 16 which engage four vertical columns 22. A lifting means 24 for raising frame 18 includes, for example, an electric motor 26 mounted upon one of columns 22 and connected through a geared transmission 28 to turn torque tube 30 which is rotatably mounted between front columns 22. A pair of drums 32 are mounted at the ends of torque tube 30, and cables 34 are wound about drums 32. The ends of cables 34 are connected to the front and rear ends of frame 18 by direct connection from drum 32 to the front ends of frame 18 and indirect connection to the rear ends of frame 18 over pulleys 36 mounted at the top of rear columns 22. Rotation of drums 32 in the clockwise direction winds cables 34 up upon them to raise frame 18, and rotation in the counterclockwise direction unwinds cables 34 to lower frame 18. The horizontal runs of cables 34 are shielded by frames 35 connected to horizontal bars 37 extending between each set of front and rear posts 22.

A front cross beam 38 and a rear cross beam 40 are independently connected across longitudinal beams 12 by movable means 42 which are, for example, constructed as resiliently mounted carriages 42 later described in detail. A pair of pickup assemblies 44 are mounted upon each of cross beams 38 and 40 for engagement under an automobile. These pick-up assemblies 44 are connected to slide back and forth across cross beams 38 and 40 for example, by sliding engagement of their mounting shoes 46 upon the upper flanges of cross beams 38 and 40 in a manner later described in detail. Jacks 48 at the upper portions of pickup assemblies 44 are rotatably and telescopically mounted as is later described in detail to facilitate their engagement with an automobile frame, and they are also hinged to shoes 46 to permit them to be dropped out of the way of an automobile in a manner later described in detail.

A bridge 50 for driving an automobile over rear end beam 16 to a position between longitudinal beams 12 and also between cross beams 38 and 40 is, for example, provided by rear and front ramp sections 52 and 54 respectively attached to rear and front edges of rear end beam 16 and movable cross beam 40. When rear end beam 16 and cross beam 40 are moved together as shown in FIGS. 15 and 17, they form a bridge 50 over which the front and rear wheels of an automobile may be driven to position it for engagement at front and rear of its frame by pickup adapters 44.

In FIGS. 2 and 3 the frame 56 of an automobile is shown in phantom as it is engaged by pickup adapters 44 prior to lifting. Positioning of adapters 44 is readily accomplished by moving cross beams 38 and 40 just under the front and rear ends of the car and engaging jacks 48 of adapters 44 with the frame 56 just inside the front and rear bumper brackets. The mode of engagement of the jacks is described in the following in conjunction with FIGS. 4–9, and FIG. 10 illustrates rear cross beam 40 which includes two cutout sections 58 which permit rear adapters 44 to be removed from cross beam 40 to prevent interference with under portions of a low-slung car as it is being driven over rear cross beam 40.

This hoist therefore, permits an automobile to be lifted with wide open accessibility to its under portion. Operations which requires such accessibility may accordingly be accomplished with complete freedom. Transmissions and mufflers may be easily replaced and undercoating performed without requiring any special auxiliary jacks or hoists which saves considerable time in each operation. The only auxiliary adapter which this hoist requires for all of the wide variety of existing types and sizes of automobiles is a light channel which is dripped across the two front jacks to lift the front end of 1951–55 Chevrolets by straddling the sway bar. Otherwise, this hoist as shown, lifts any automobile and permits any operation upon the underside to be performed without any auxiliary jacks, stands or other make-shift devices which transmission and muffler replacement usually require.

Figure 8:
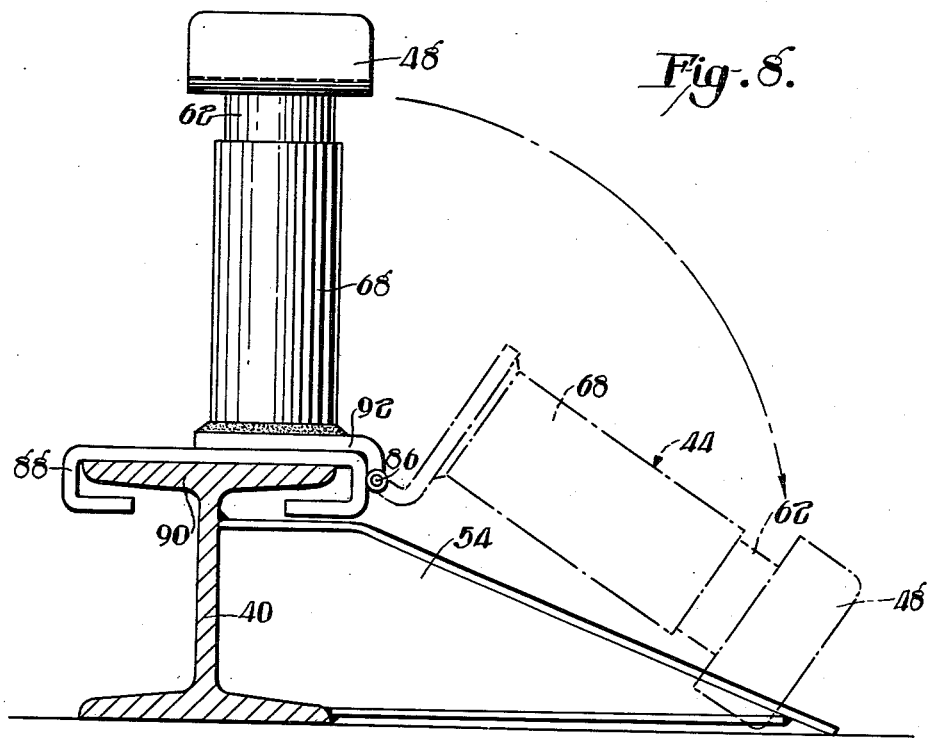
FIG. 8 is a view in elevation of the adapter shown in FIG. 6 in its downwardly folded condition.
Figure 9:
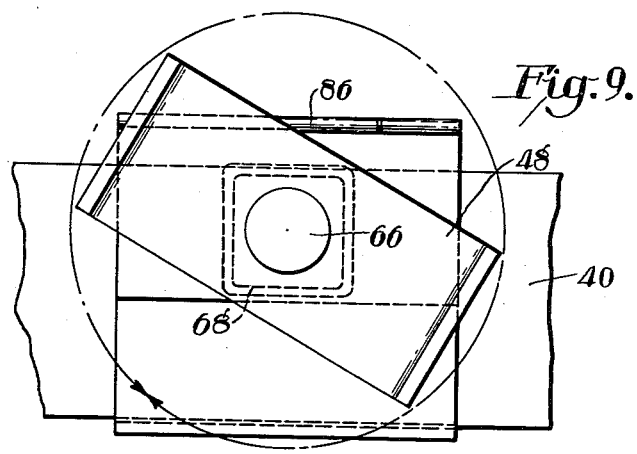
FIG. 9 is a plan view of the adapter shown in FIGS. 4–6 in a swiveled condition.

Details of adjustable pickup adapters 44 are shown in FIGS. 4–9. The upper or jack portions 48 of adapters 44 are rotatably mounted upon vertically disposed headed pins 60 which are secured to the upper portion of tubes 62 by connection to collars 64 secured within tubes 62, for example, by welding. The lower ends of pins 60 are secured to collars 64, for example, by threaded engagement and tack welding. Sufficient clearance is provided between the head 66 of pins 60 and the top of tube 62 to permit free rotation of U-shaped jack 48 as indicated in FIG. 9.

Jack 48 together with tube 62 may be vertically adjusted with respect to the tubular base or pedestal 68 of adapter 44 by sliding insertion within it. Tube 62 may be held at one of several vertical heights with respect to pedestal 68 by engagement of the nose of pawl 70 within one of several notches 72 provided within the side of tube 62. Pawl 70 is resiliently urged into engagement with notches 72 by a torsion spring 74 which is mounted above shaft 76 upon which pawl 70 is also mounted by extension 78. Torsion spring 74 reacts between a stationary portion of bracket 80 supporting shaft 76 and the underside of pawl 70 to urge it into engagement with notches 72 thereby holding tube 62 at a selected vertical height. The inclined nose 82 of pawl 70 permits the edges of notches 72 to divert pawl 70 out of engagement when tube 62 is manually raised, and the straight upper surface 84 of pawl 70 locks under the upper surface of each of notches 72 to hold the adapter in the adjusted position.

Figure 10:
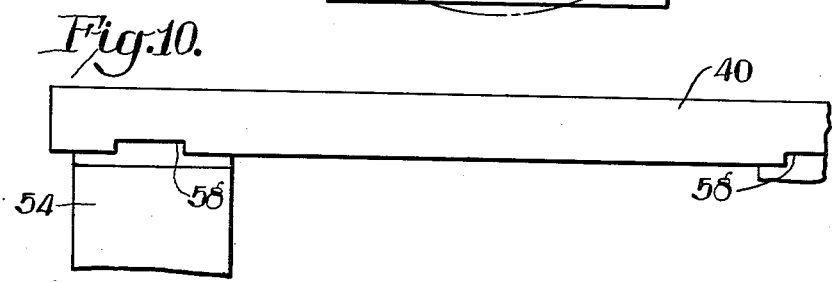
FIG. 10 is a plan view of a rear cross beam of the embodiment shown in FIG. 1.

FIGS. 6–8 illustrate the manner in which pedestal 68 of adapter 44 is secured through a hinge 86 to a shoe 88 which hooks about the upper flange 90 of cross beams 38 and 40 and permits adapter 44 to be slid transversely back and forth along cross beams 38 and 40. Angular plate 92 to which pedestal 68 is welded is attached to one portion of hinge 86, and sliding shoe 88 is welded to the other portion of hinge 86 to permit adapter 44 to be rotated downwardly out of the way of a low-slung automobile when this is necessary to facilitate its movement over cross beams 38 or 40 as shown in FIG. 8. It is also possible to remove adapter jack 44 from rear cross beam 40 by disengagement through slots 58 as shown in FIG. 10.

FIGS. 11–14 show details of resiliently mounted carriages 42 which movably connect the ends of cross beams 38 and 40 with longitudinal beams 12. Carriages 42 each include a saddle 94 which is rolled back and forth along longitudinal beams 12 by engagement of rollers 96 upon inverted V-shaped tracks 98 welded to the upper flange 100 of longitudinal beams 12. A horizontal flange 102 is welded to saddle 94 on both sides of the lower portion of a T-shaped aperture 104 extending through saddle 94. Stiffening plates 106 are welded to the sides of lower portion of aperture 104 for stiffening and guiding purposes.

The ends of cross beams 38 and 40 which are reinforced by vertical plates 108 attached to both sides of the web of beams 38 and 40, are inserted through aperture 104 which is large enough to permit a substantially vertical movement between the upper flange 100 and the lower flange 110 of longitudinal beams 12. A pair of horizontal lugs 112 are welded to the upper ends of beams 38 and 40 to overlie plates 102 of saddle 94. Coil springs 114 are mounted between lugs 112 and supporting plates 102 by nut and bolt assemblies 116 thereby resiliently supporting the ends of beams 38 and 40 upon saddles 94. In the position shown in FIGS. 12 and 13, springs 114 maintain cross beams 38 and 40 out of contact with beams 12 thereby permitting carriages 42 to freely roll beams 38 backward and forward to position them. However, when a load such as an automobile is imposed upon beams 38 and 40, it compresses springs 114 enough to move the lower end surface 118 of beams 38 and 40 into contact with the upper surface 120 of lower flange 110 of beam 12 to permit the load to be rigidly supported. Furthermore, contact between end 118 and surface 120 prevents any subsequent forward or backward movement of beams 38 and 40. This movement in the absence of load is also facilitated by rollers 122 shown in FIG. 13 attached to saddles 94 in position to bear upon the vertical web 124 of beams 12.

In FIGS. 15 and 16 is shown a hoist 10A which is another embodiment of this invention. Hoist 10A is similar to hoist 10 in all respects with the exception of the lifting means 24A being provided by a pair of hydraulic lift cylinder and piston assemblies 130A connected centrally to beams 12A. This form of installation eliminates the necessity for any overhead superstructure if this is desirable for any reason. The assembled condition of bridge 50A provided by ramps 52A and 54A respectively connected to end rear beam 16A and rear cross beam 40A is shown in FIG. 16. Operation of hoist 10A in all respects with the exception of the lefting mechanism is identical to that previously described.

In FIGS. 17 and 18 is shown a modification 10B of hoist 10A in which cylinder and piston assemblies 130B are connected centrally to front and rear end beams 14B and 16B instead of to longitudinal beams 12B. Hoist 10B provides freedom of access under longitudinal beams 12B when it is raised whereas hoist 10A provides freedom of motion under end beams 14A and 16A when hoist 10A is raised.

What is claimed is:

1. An automobile hoist comprising a pair of vertically movable longitudinally disposed beams which are substantially longer than an automobile and spaced apart from each other a distance sufficient to permit an automobile to be driven between them with said beams disposed along the outsides of the wheels of said automobile, a pair of individual cross beams means disposed transversely across said longitudinal beams, movable means separately connecting said cross beams to move along substantially the entire length of said longitudinal beams to permit said cross beams to be independently positioned in back and in front of and under the extreme front and rear portions of said frame of automobile, pickup elements adjustably attached to said cross beams for engaging the extreme front and rear portions of said frame of said automobile from below, lifting means connected to said longitudinal beams for raising them together with an automobile supported between them upon said cross beams, carriage means connecting the ends of said cross beams to said longitudinal beams for facilitating their forward and backward movement, resilient means supporting said cross beams in a free floating fashion from said carriage means, and the ends of said carriage means overlying a supporting portion of said longitudinal beams to permit said supporting portion to carry any load imposed upon said cross beams when it is sufficient to overcome the supporting effect of said resilient means.

2. An automobile hoist as set forth in claim 1 wherein said longitudinal beams are disposed parallel to each other, and said movable means comprises slidable connecting means which permit said cross beams to slide back and forth between said longitudinal beams.

3. An automobile hoist as set forth in claim 2 wherein end beams connect the forward and rear ends of said longitudinal beams to constitute a substantially rectangular frame, and said cross beams slide back and forth between said end beams.

4. An automobile hoist as set forth in claim 1 wherein said pickup elements comprise a pair of adapters mounted to slide transversely along both of said cross beams, and said adapters being adjustable in height for engaging them with said frame of said automobile.

5. An automobile hoist as set forth in claim 4 wherein said adapters are telescopic.

6. An automobile hoist as set forth in claim 4 wherein a hinged carriage connects said adapters to said cross beams to permit said adapters to be dropped out of the way of the lower portion of an automobile.

7. An automobile hoist as set forth in claim 4 wherein one of said cross beams is notched to permit disengagement of said pick-up elements and removal.

8. An automobile hoist as set forth in claim 1 wherein said carriage means includes rollers, and a track being mounted upon an upper surface of said longitudinal beams which is engaged by said rollers.

9. An automobile hoist as set forth in claim 8 wherein said track comprises an inverted V-section, and said rollers are correspondingly notched to ride upon the top of said V-section.

10. An automobile hoist as set forth in claim 1 wherein said lifting means comprises lifting posts, an electric motor speed reducing transmission, pulley means and cable means.

11. An automobile hoist as set forth in claim 10 wherein said lifting posts comprise four vertical columns disposed adjacent the front and rear ends of said longitudinal beams, connecting means couple the ends of said longitudinal beams to slide up and down about said columns, and said pulleys react between a stationary portion of said hoist and said longitudinal beams over the upper portion of said columns through said pulley means for lifting said longitudinal beams.

12. An automobile hoist as set forth in claim 1 wherein said lifting means comprises hydraulic piston and cylinder means reacting upwardly against said longitudinal beams.

13. An automobile hoist as set forth in claim 12 wherein said hydraulic piston and cylinder means comprises a pair of transversely disposed pistons and cylinders reacting directly against said longitudinal beams.

14. An automobile hoist as set forth in claim 12 wherein front and rear end beams connect the forward and rear ends of said longitudinal beams, said hydraulic piston and cylinder means comprise a pair of hydraulic piston and cylinder assemblies, one of said piston and cylinder assemblies reacting upwardly against said front end beam, the other of said piston and cylinder assemblies reacting upwardly against said rear end beam, and said connection of said front and rear end beams to said longitudinal beams providing said lifting means for raising them.

15. An automobile hoist as set forth in claim 1 wherein front and rear end beams connect the ends of said longitudinal beams, an outside ramp element being connected to a portion of said rear beam disposed outside of said longitudinal beams, said cross beam adjacent said rear end beam being designated as a rear cross beam, and a corresponding inside ramp element being attached to the front of said rear cross beam for forming a bridge in co-operation with said outside ramp section when said rear cross beam is disposed adjacent said rear end beam which permits the wheels of an automobile to pass over said rear end and cross beams.

References Cited in the file of this patent

UNITED STATES PATENTS

| | | |
|---|---|---|
| 1,915,024 | Logette et al. | July 28, 1930 |
| 1,958,026 | Walker | May 8, 1934 |
| 1,990,242 | Mizer | Feb. 5, 1935 |
| 2,057,335 | Hott | Oct. 13, 1936 |
| 2,124,726 | Blum | July 26, 1938 |
| 2,136,750 | Myers | Nov. 15, 1938 |
| 2,158,399 | Carter | May 16, 1939 |
| 2,309,123 | Kiesling | Jan. 26, 1943 |
| 2,349,389 | Thompson | May 23, 1944 |
| 2,511,316 | Cody | June 13, 1950 |
| 2,593,635 | Walker | Apr. 22, 1952 |
| 2,612,355 | Thompson | Sept. 30, 1952 |
| 2,624,546 | Haumerson | Jan. 6, 1953 |
| 2,654,444 | Cochin | Oct. 6, 1953 |

UNITED STATES PATENT OFFICE
CERTIFICATE OF CORRECTION

Patent No. 3,117,652　　　　　　　　　　　　　　January 14, 1964

George A. Wallace

It is hereby certified that error appears in the above numbered patent requiring correction and that the said Letters Patent should read as corrected below.

Column 3, line 34, for "dripped" read --- dropped ---; column 4, line 57, for "lefting" read --- lifting ---.

Signed and sealed this 30th day of June 1964.

(SEAL)
Attest:

ERNEST W. SWIDER　　　　　　　　　　　　　　EDWARD J. BRENNER
Attesting Officer　　　　　　　　　　　　　　　Commissioner of Patents